March 23, 1965
D. E. WEGLAGE ETAL
3,174,471
INTERNAL COMBUSTION ENGINE DRIVEN LAWN MOWER ESPECIALLY
MECHANICAL STARTING MECHANISM THEREFOR
Filed Nov. 9, 1961
6 Sheets-Sheet 1
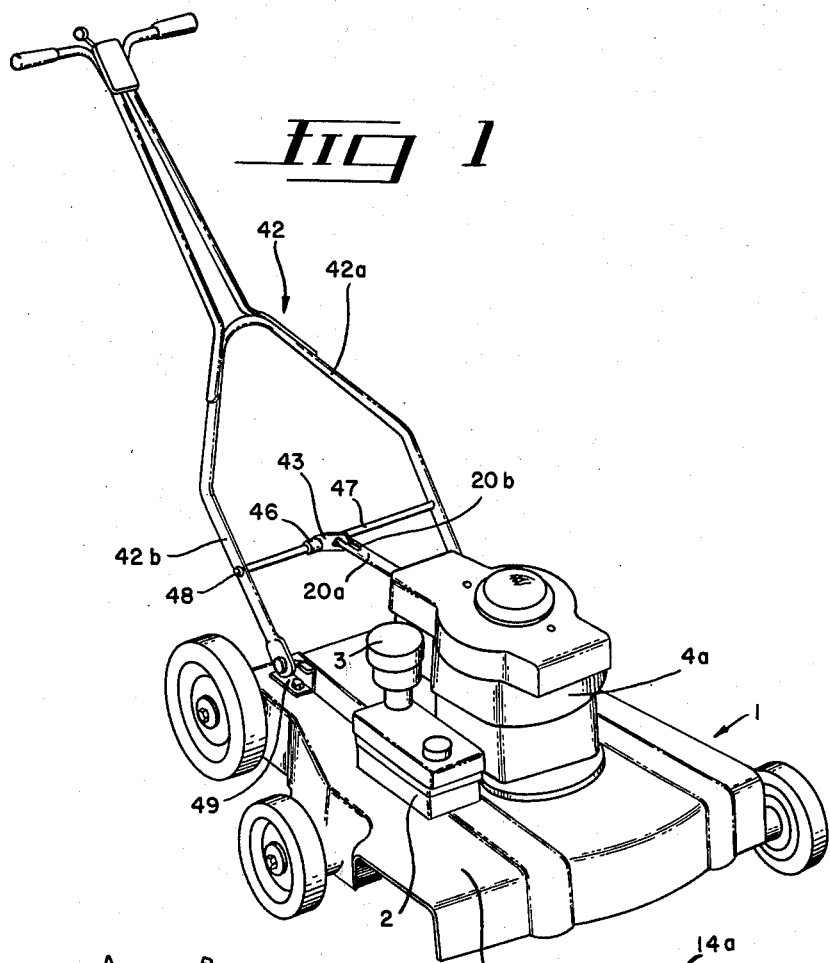
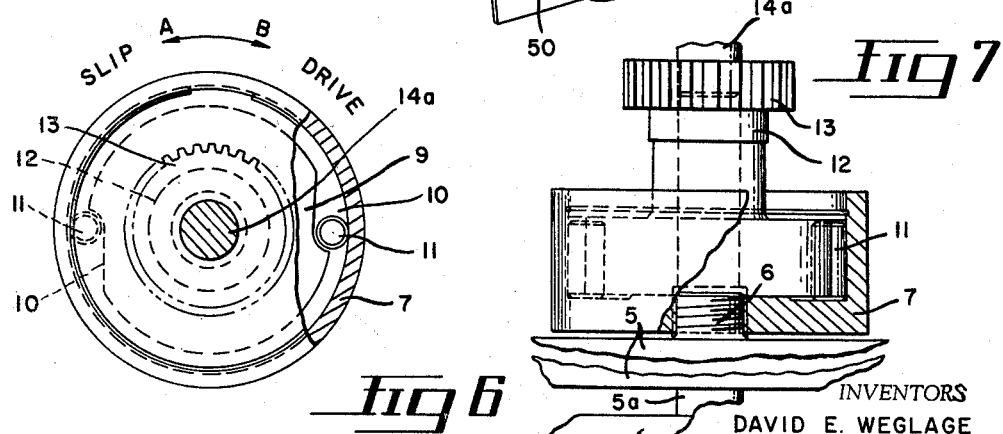
INVENTORS
DAVID E. WEGLAGE
ALBERT A. WEGLAGE
BY

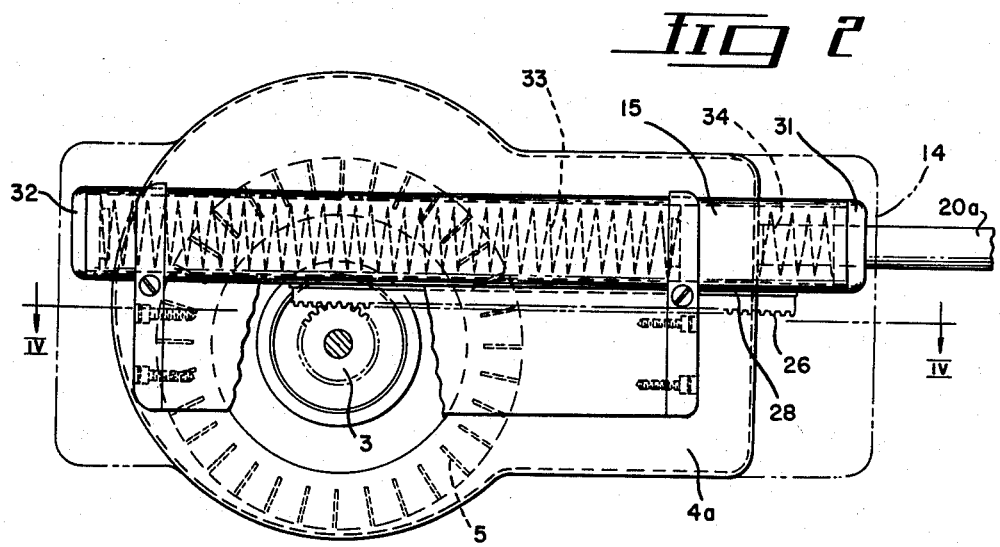
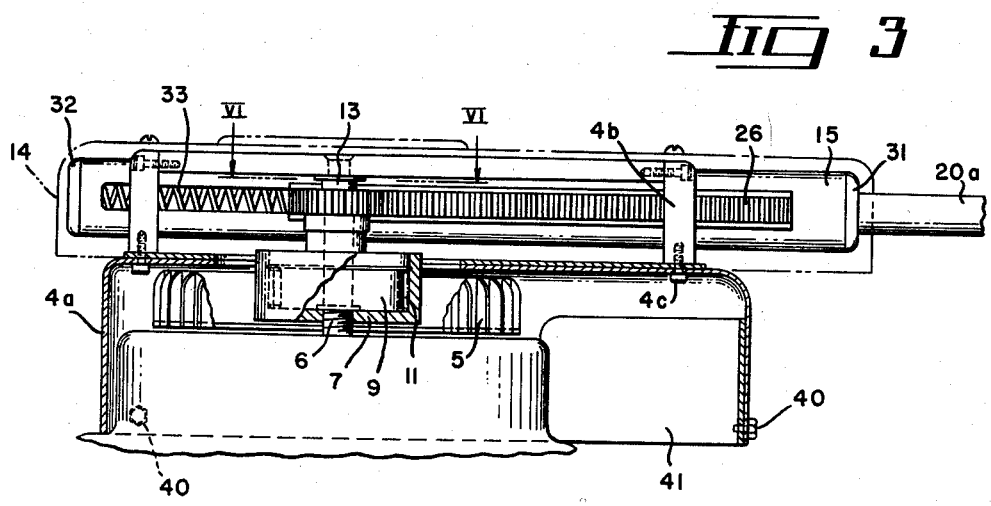
INVENTOR.
DAVID E. WEGLAGE
BY ALBERT A. WEGLAGE

March 23, 1965    D. E. WEGLAGE ETAL    3,174,471
INTERNAL COMBUSTION ENGINE DRIVEN LAWN MOWER ESPECIALLY
MECHANICAL STARTING MECHANISM THEREFOR
Filed Nov. 9, 1961    6 Sheets-Sheet 3
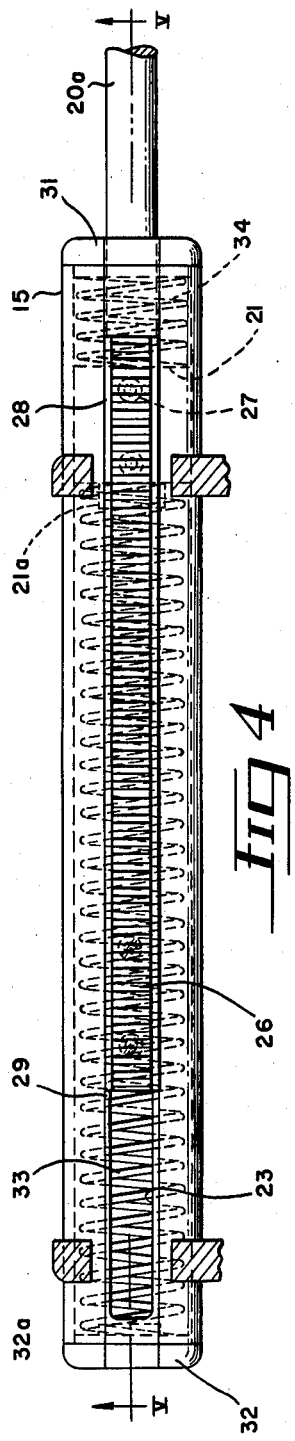
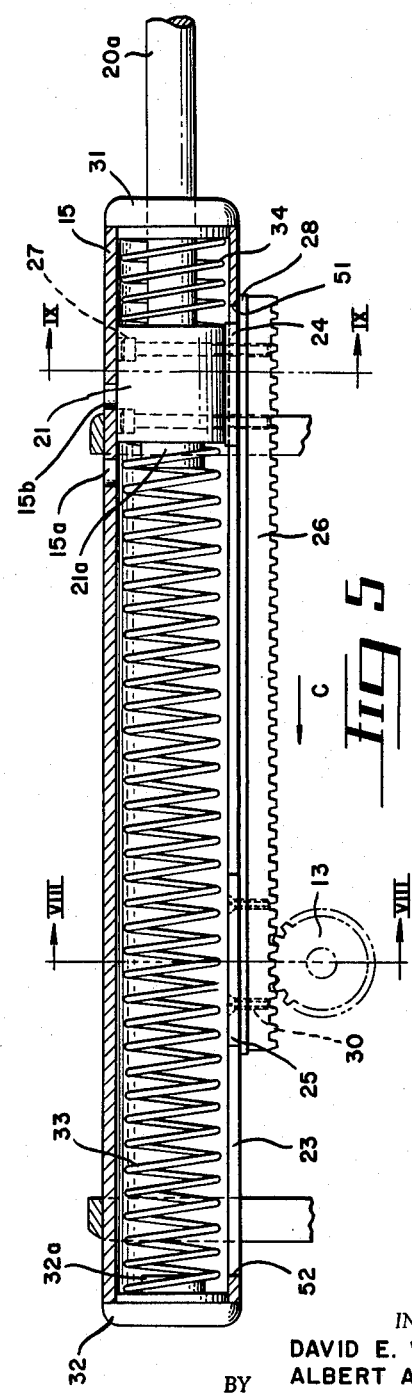
INVENTOR.
DAVID E. WEGLAGE
ALBERT A. WEGLAGE
BY March 23, 1965  D. E. WEGLAGE ETAL  3,174,471
INTERNAL COMBUSTION ENGINE DRIVEN LAWN MOWER ESPECIALLY
MECHANICAL STARTING MECHANISM THEREFOR
Filed Nov. 9, 1961  6 Sheets-Sheet 4
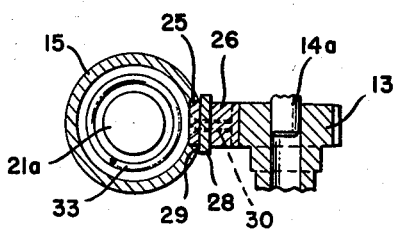
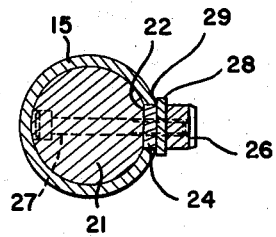
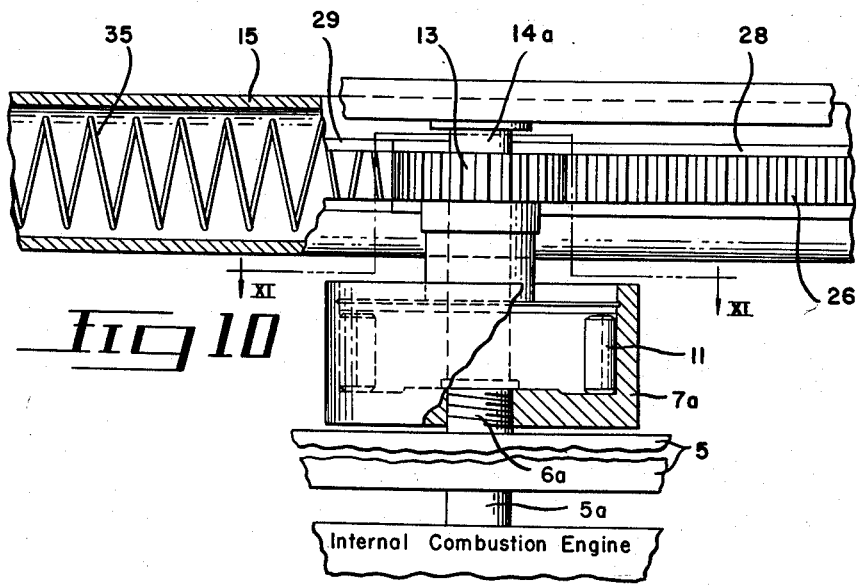
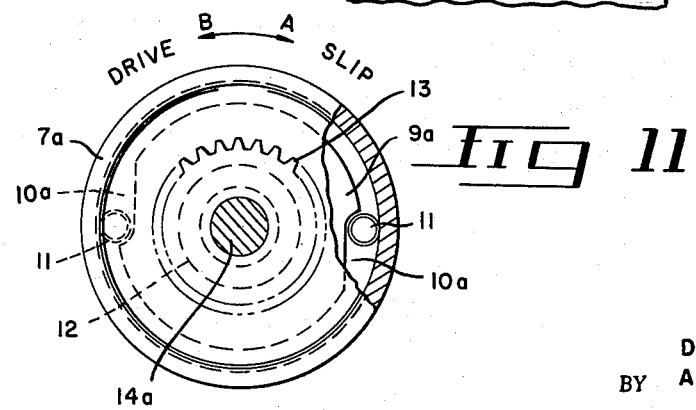
INVENTOR.
DAVID E. WEGLAGE
BY ALBERT A. WEGLAGE

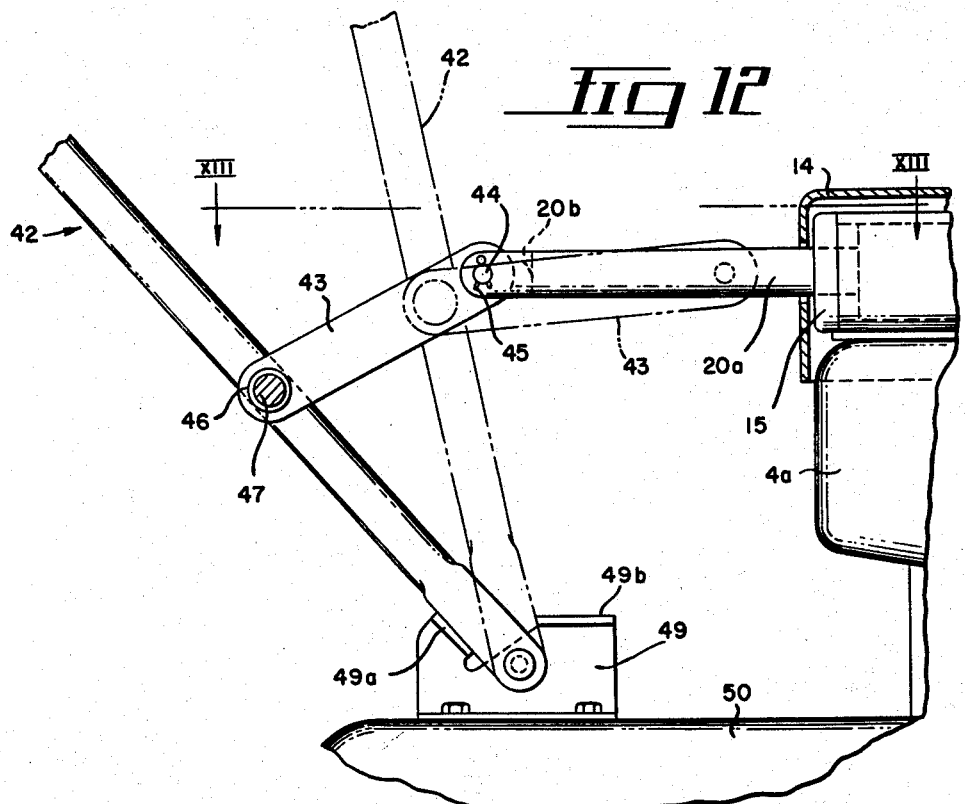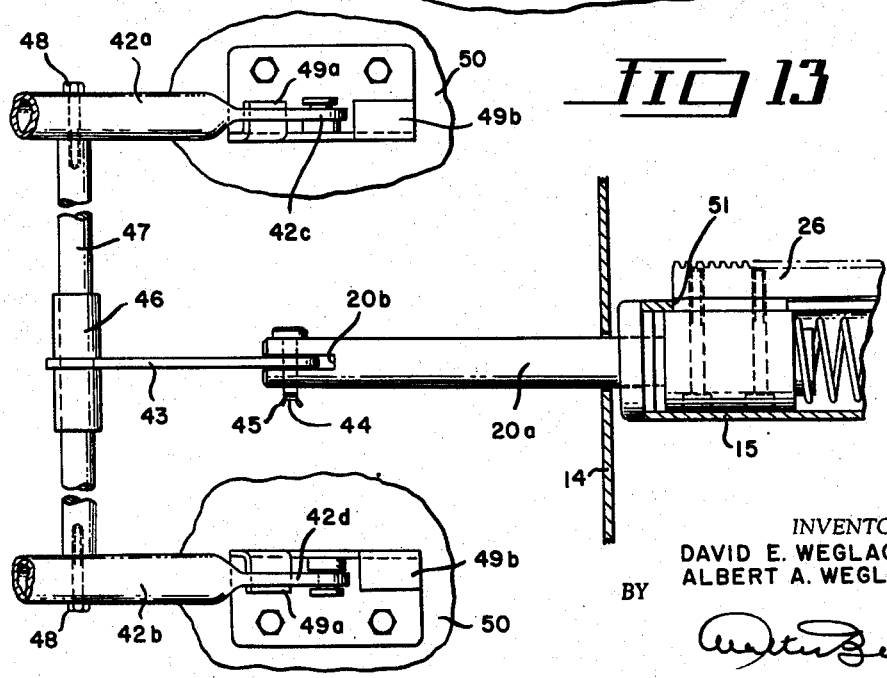

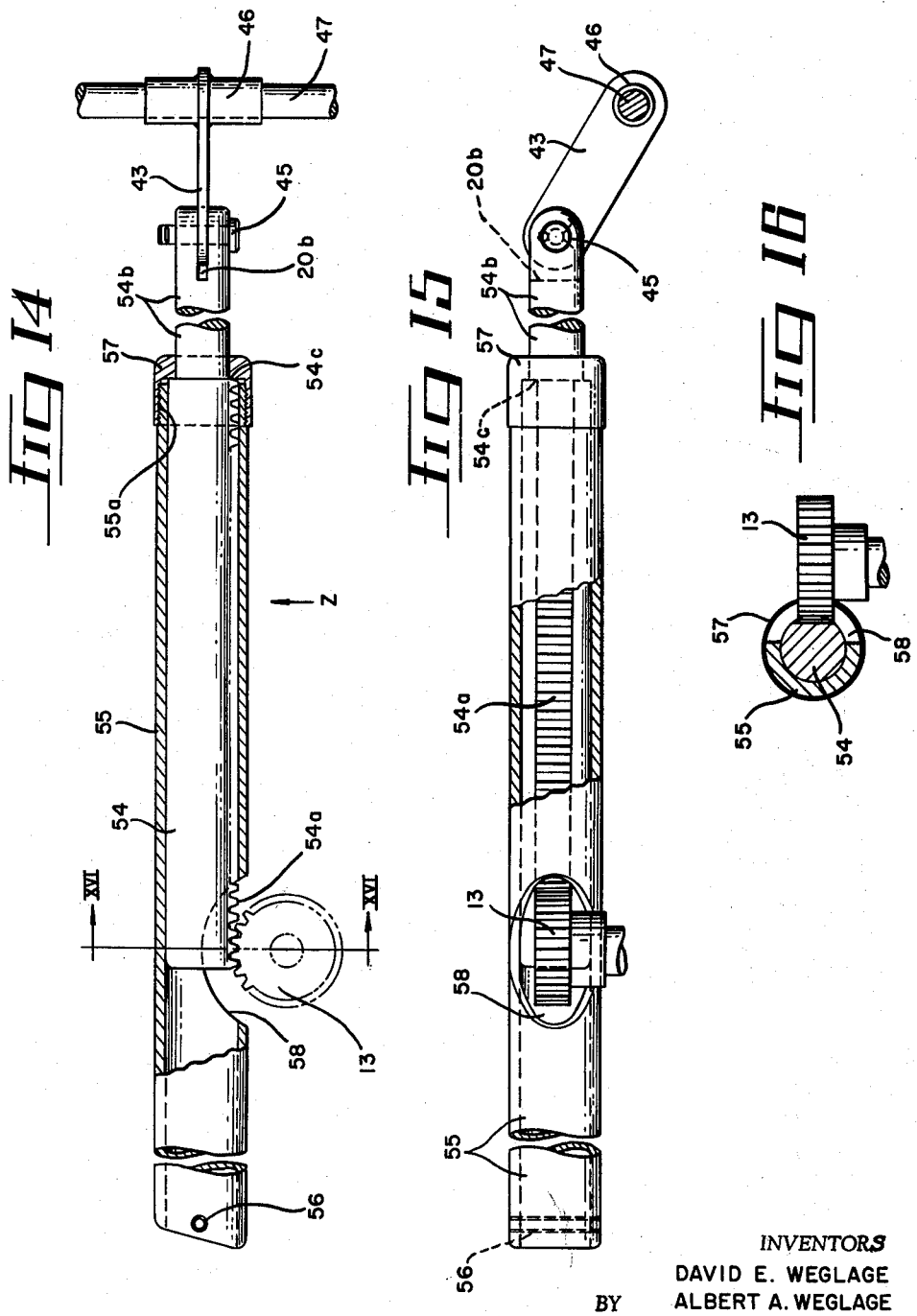

United States Patent Office 3,174,471
Patented Mar. 23, 1965

3,174,471
INTERNAL COMBUSTION ENGINE DRIVEN LAWN MOWER ESPECIALLY MECHANICAL STARTING MECHANISM THEREFOR
David E. Weglage and Albert A. Weglage, Dayton, Ohio, assignors of one-third to Walter Becker, Dayton, Ohio
Filed Nov. 9, 1961, Ser. No. 151,209
6 Claims. (Cl. 123—185)

The present invention relates to a power lawn mower driven by an internal combustion engine and, more specifically, concerns mechanical starter means for such lawn mower. This is a continuation-in-part application of our co-pending patent application Serial No. 139,657, filed September 21, 1961, now abandoned.

For many years, efforts have been made to develop mechanical starters for starting the internal combustion engine of a power lawn mower. Thus, for instance, a starter has been suggested which comprises a gear rack meshing with a pinion connected to the gasoline engine. According to one known type of mechanical starters, the gear rack, which is slidably mounted in fixed guiding means, has a foot operable pedal or handle directly rigidly connected to the gear rack so that the hand or the foot must during the starting operation move directly along a straight line determined by the guiding means for said gear rack. Such a straight movement of the hand or foot in practically direct contact with the gear rack is highly impractical and hardly feasible at all for all practical purposes. Therefore, this starter means was not adopted in connection with gasoline engine operated lawn mowers.

In order to make the above mentioned starter means practically more feasible, a system was developed according to which foot pedals were provided which could be pushed downwardly in the manner of foot pedals in automobiles and which actuated the gear rack stepwise by a pawl and ratchet mechanism in connection with an impulse starter. However, this starting system was far too complicated and expensive for any practical use. Therefore, in an effort to develop a practical mechanical starter, the gear rack pinion system was discarded completely and the well-known recoil system was developed according to which a rope was wound around the flywheel of the engine and pulled out quickly for starting the engine. If the engine for some reason does not start right away, the rope has to be wound up again and the procedure has to be repeated. This pulling procedure is not only very tedious but also very exerting and tiring regardless of whether or not spring means are provided for automatically winding up the rope again after each pulling operation.

Moreover, the person who wants to start the engine has to do this in a bent down or stopped down position in which said person has to hold the mover fast and is very close to the rotary blades so that there exists the danger that the person's foot might be too close to the rotary blades and might be injured thereby as soon as the engine starts.

In an endeavor to cut down the physical effort to start thes internal combustion engine of the mower, a design has been developed according to which a torsion spring is connected to the flywheel or crankshaft of the engine by means of a free-wheel or overriding clutch. With this design, a crank or handle is connected to one end of the torsion spring under a pre-load, and said handle has to be cranked until the torsion spring is wound up, while a pawl and ratchet mechanism is provided to prevent the handle from accidentally turning back. In addition thereto, there is provided a lock and release mechanism which has to be operated in such away that the lock in form of a pin has to be pushed in between the vanes of the flywheel prior to the cranking of the handle. After the cranking operation has been completed, this pin is pulled out from between the vanes to thereby release the flywheel to allow said torsion spring to turn the fly-wheel through the intervention of said overriding clutch.

This arrangement has the same drawback as the rope pulling arrangement insofar as also in this instance the cranking of the engine must be effected in bent-over or stooped-down position with the feet of the respective person close to the mower. Since the torsion spring is under pre-load from the very start and since the cranking becomes continuously harder with each rotation of the crank, it is additionally necessary to hold the mower in order to prevent the same from being turned by the cranking operation. It should also be noted that the cranking operation is essentially a pulling operation and as such is both tiring and strenuous.

It is, therefore, an object of the present invention to provide a mechanical starting mechanism for an internal combustion engine driven lawn mower, which will overcome the above mentioned drawbacks.

It is another object of this invention to provide a mechanical starting mechanism for a lawn mower of the above mentioned type, in which it will no longer be necessary to effect the cranking of the engine in bent-over or stooped-down position.

Another object of this invention consists in the provision of a mechanical starting mechanism for internal combustion engine driven horticultural implements such as lawn mowers, in which the pulling action necessary heretofore for the cranking of the engine will be replaced by an easy pushing operation.

It is a further object of this invention to provide a mechanical starting mechanism for internal combustion engine driven lawn mowers, in which the handle proper for pushing the lawn mower over the area to be mowed will form a part of the starting mechanism for the lawn mower engine.

It is also an object of this invention to provide a mechanical starting mechanism for internal combustion engine driven lawn mowers as set forth in the preceding paragraph, in which the starting of the lawn mower engine may be effected by actuation of the handle for pushing the lawn mower.

These and other objects and advantages of the invention will appear more clearly from the following specification in connection with the accompanying drawings, in which:

FIG. 1 illustrates in perspective a view of an internal combustion engine driven lawn mower with a starting mechanism according to the present invention.

FIG. 2 is a plan view of the starting mechanism shown on a scale somewhat larger than that of FIG. 1.

FIG. 3 is a side view of the starting mechanism shown in FIG. 2.

FIG. 4 is a section through the starting mechanism, said section being taken along the line IV—IV of FIG. 2.

FIG. 5 represents a section taken along the line V—V of FIG. 4.

FIG. 6 is a view, partly broken awy, taken along the line VI—VI of FIG. 3.

FIG. 7 is a side view and partial section of the overriding clutch shown in FIG. 6.

FIG. 8 is a section taken along the line VIII—VIII of FIG. 5.

FIG. 9 is a section taken along the line IX—IX of FIG. 5.

FIG. 10 is a section similar to that of FIG 3, but of a modified starter mechanism.

FIG. 11 is a section taken along the line XI—XI of FIG. 10.

FIG. 12 illustrates on a considerably larger scale than

FIG. 1 a portion of the mower handle and its connection with the other starting elements for the engine.

FIG. 13 is a section taken along the line XIII—XIII of FIG. 12.

FIG. 14 illustrates partly in section a particularly simple construction for the gear rack pinion system and the tubular guide for the gear rack.

FIG. 15 illustrates a view, partly in section, of FIG. 14 as seen in the direction of the arrow Z.

FIG. 16 is a section along the line XVI—XVI of FIG. 14.

General arrangement

The present invention makes use of the heretofore known arrangement according to which the flywheel or crankshaft of the internal combustion engine driving the lawn mower has connected thereto a pinion-equipped overriding clutch while said pinion meshes with the gear rack extending in longitudinal direction of the mower adapted in response to a longitudinal movement thereof to start the engine. The present invention is characterized primarily in that the rack meshing with the pinion-equipped clutch is operatively connected to the lawn mower handle proper which is pivotally connected to the lawn mower so that the engine may be started by a slight tilting movement of said handle.

Structural arrangement

Referring now to the drawings in detail and FIG. 1 thereof in particular, FIG. 1 shows a lawn mower generally designated 1 which in the usual manner is provided with a gas tank 2, an air filter 3, and a motor block 4. Lawnmower 1 is furthermore provided with a push handle 42 having two legs 42a, 42b which are pivotally supported by brackets 49. Brackets 49, in their turn, are fixedly connected to the deck 50 of mower 1. A transverse bar 47 is interposed between said legs 42a, 42b and connected thereto in any convenient manner, for instance by screw bolts 48. Bar 47 is drivingly connected to the crankshaft 5a of the engine of the mower (as will presently appear) so that when the engine is at a standstill and the push handle is pushed forward, the engine is cranked and started. More specifically, the engine has a flywheel 5 (see FIGS. 2 and 5) which is connected in any convenient manner, as is customary, to the crankshaft 5a of the engine. The flywheel 5 has connected thereto a threaded bolt 6 to which is threadedly but firmly connected a housing 7 of an overriding clutch generally designated 8. This overriding clutch consists in addition to the housing 7 of an inner rotatable member 9 with customary cutouts 10 between which there are floatingly arranged pins 11. The inner member 9 has connected thereto a neck 12 to which is fastened in any convenient manner, for instance by brazing, a gear 13. It will thus be evident that by turning the gear 13 in the direction of the arrow A in FIG. 6, it will be possible without difficulties to rotate the inner clutch member 9. On the other hand, by rotating the gear 13 in the direction of the arrow B (FIG. 6), the clutch will be engaged so that rotation of gear 13 will automatically rotate the flywheel 5 and thereby the crankshaft 5a of the engine connected thereto.

The mower shown in FIG. 1 is furthermore provided with a cover plate 14 which covers up the clutch 8 and is provided with a guiding pin 14a (FIGS. 6, 7) for properly locating and positioning the cover 14. The starting mechanism according to the invention furthermore comprises a tubular member 15 (FIGS. 2 to 5) in which is slidably mounted a plunger 21 (FIGS. 2 and 5). Plunger 21 is connected to one end of a push rod 20a the other end of which is provided with slot 20b (FIGS. 12 and 13). This slot 20b is engaged by one end of a link 43 which at said slot is linked to the push rod 20a by a pin 44 secured in its position by means of a cotter pin 45. The other end of link 43 has connected thereto in any convenient manner, for instance by welding, a bushing 46 which is rotatably mounted on the transverse bar 47. As will be seen from FIG. 9, the lower portion of the plunger 21 is slightly flattened at 22 for a purpose which will presently appear. The tubular member 15 is provided with a longitudinal slot 23 (FIG. 4) in which are slidably mounted sliding plates 24, 25. The plate 24 engages the flattened surface portion 22 of plunger 21 while the bottom portion of slide plate 24 is engaged by the rear portion of a gear rack 26. As will be seen from FIGS. 5 and 9, the gear rack 26, plate 24 and plunger 21 are connected to each other by bolts 27 which latter are accessible through openings 15a, 15b in the tubular member 15. The gear rack 26 is provided with a flange 28 which extends all the way along the gear rack 26 and is adapted to slide on flattened shoulders 29 provided on the tubular member 15. The front of the gear rack 26 has connected thereto by means of screws 30 the sliding plate 25 which, as mentioned above, is slidable in slot 23.

The ends of the tubular member 15 are closed by closure members 31, 32. The closure member 32 is provided with a slight inwardly directed protrusion 32a for receiving one end of a spring 33 the other end of which is received by a similar protrusion 21a forming part of the plunger 21. The tubular member 15 furthermore comprises a cushioning spring 34 which is interposed between the plunger 21 and the closure member 31. The purpose of this cushioning spring 34 consists in preventing the spring 33 when expanding under pressure to push the plunger 21 against the closure member 31. The tubular member 15 is mounted on the flywheel cover 4a in any convenient manner, e.g. by brackets 4b and screws 4c as shown (FIG. 3) but may also be connected in any other way as, for instance by welding.

As previously mentioned, the ends 42c, 42d (FIG. 13) of legs 42a, 42b of the push handle 42 (FIG. 1) are pivotally connected to the brackets 49. The tilting movement of the mower handle is limited by abutments 49a, 49b provided at the brackets 49. Similarly, the movement of the rod 20 is also limited in both directions by abutments 51, 52 (FIGS. 5, 13, FIG. 13 showing the abutment 51 only). Abutment 51 is with regard to abutments 49a so arranged that the rod 26 hits the abutment 51 slightly before the lower leg ends 42c, 42d hit the abutment 49a. This difference may, for instance, amount to $\frac{1}{64}''$. The purpose of this arrangement consists in that normally, the stroke of the rack is to be limited by the abutment 51. However, if, for example, the front wheels of the mower are to be lifted off the ground by pressing down the mower handle 42, the load of the mower should not act upon the abutment 51 but should be absorbed by handle 42. To this end, the lower ends of the handle legs 42a, 42b at the time the rack 26 hits the abutment 51, are away from the abutment 49 by a very slight distance only, for instance, $\frac{1}{64}''$, and since the mower handle 42 has a certain elasticity, it will be appreciated that when the handle 42 is pressed downwardly after its normal tilting movement for lifting the front wheels of the mower off the ground, the lower ends 42c, 42d will abut the abutment 49b so that the mower weight will then be absorbed by the handle 42 rather than by the abutment 51.

Operation of the embodiment of FIGS. 2 to 9

In order to start the internal combustion engine of the mower by means of the starter mechanism shown in FIGS. 2 to 9, the operator pushes forward the handle 42 thereby pushing rod 20a forward and compressing the spring 33 by means of the plunger 21. Simultaneously with the forward movement of the rod 20a and plunger 21, the gear rack 26 is moved forward in the direction of the arrow C (FIG. 5) whereby the gear or pinion 13 meshing with gear rack 26 will turn in the direction of the arrow A (also see FIG. 6). This is the direction of rotation of the pinion 13 in which the latter is freely movable, i.e. is not engaged with the housing 7. As soon as the operator feels that the plunger 21 has reached the end of its leftward stroke with regard to FIG. 6, i.e. that the spring 33 has been compressed to its fullest extent, he will allow the spring quickly to expand while permitting his hand on the handle to follow the return movement of the handle. As a result thereof, the gear rack 26 will move in a direction counter to the direction of the arrow C so that the pinion 13 is now rotated in the direction B (FIG. 6) in which the pins 11 will couple the pinion 13 to the housing 7 which latter, as indicated above, is firmly connected by means of the threaded bolt 6 to the flywheel 5. Consequently, the turning movement of the flywheel 5 in the direction of the arrow B will crank the crankshaft 5a of the engine. Inasmuch as the stroke of the gear rack 26 is so dimensioned that a cranking of the crankshaft of the engine by the stroke of the gear rack 26 will at any rate move the engine piston through at least one compression stroke and ignition stroke, the engine will automatically be started by the stroke of the gear rack 26 in a direction opposite to the arrow C. If the engine should not start for some reasons, the starting procedure by pushing the handle 42 is, of course, to be repeated.

When the spring 33 expands during the stroke of the gear rack 26 in a direction opposite to the arrow C, the cushioning spring 34 will protect the plunger 21 from being thrown against the lid 31.

*Embodiment of FIGS. 10 and 11*

Referring now to the embodiment of FIGS. 10 and 11, this embodiment differs from that of FIGS. 2 to 9 primarily in that the starting of the engine is not effected by a spring, such as spring 33, but is effected by manual force pushing the handle 42 in the same direction as the latter is pushed forward in the embodiment of FIGS. 2 to 9 for loading the spring 33. Inasmuch as in these circumstances the starting movement of the gear rack 26 will be in the direction of the arrow C (FIG. 5), rather than in opposite direction, the overriding clutch must, of course, be reversed. In other words, with regard to FIG. 11, the clutch will be engaged when the pinion 13 rotates in the direction B and will be disengaged when the pinion 13 rotates in the direction A. Accordingly, instead of connecting the bolt 6 by right-hand thread with the flywheel 5 as shown in FIG. 7, the bolt 6a (FIG. 10) is connected to the flywheel 5 by a left-hand thread with the engaging thread of housing 7a cut accordingly. In addition thereto, the cutouts 10a in the inner clutch member 9a of FIG. 11 are, of course, shaped so as to be effective in opposite direction to the cutouts 10 in the inner clutch member 9 of FIG. 6.

In order to obviate the necessity of returning the handle 42 by hand to its starting position after each starting action, the tubular member 15 is provided with a weak retraction spring 35. In every other respect the arrangement of FIGS. 10 and 11 fully corresponds to that of FIGS. 2 to 9.

For the sake of completeness, it may also be mentioned that the entire starting unit, described above as far as it comprises the cover 14, the tubular member 15, the cover 4a, the gear rack and the handle unit, can easily be removed from the mower by merely taking out the three bolts 40 (two only being shown) which are on each mower unit, thereby facilitating maintenance and servicing of the motor itself. Inversely, mowers equipped with other type starting mechanisms as, for instance rotatable cranking mechanisms, which likewise have as standard equipment a flywheel shroud 4a connected to the crank case housing 41 by bolts 40 can easily be replaced by a cranking mechanism according to the invention. To this end, it is merely necessary to remove the flywheel shroud 4a with the cranking unit therein and to replace the same by the shrouding unit 4c with the starting mechanism of the present invention.

*Embodiment of FIGS. 14 to 16*

FIGS. 14 to 16 illustrate a preferred gear rack pinion system which is greatly simplified over the gear rack pinion system illustrated in FIGS. 2 to 11. According to the arrangement of FIGS. 14 to 16, the plunger 21 reciprocable in the tubular member 15 of the arrangements of FIGS. 2 to 11 has been completely eliminated. Instead a round bar 54 is with a slide fit reciprocably mounted in a tubular member 55 and has teeth 54a cut therein so that the bar 54 forms a gear rack. The bar or rod 54 is preferably of stock material slide fitting in the tubular member 55 which preferably is also of stock material. One end (the left-hand end with regard to the drawing) of said tubular member 55 is open and has a stop pin 56 extending therethrough to limit the left-hand stroke (with regard to the drawing) of gear rack 54. The right-hand end of bar 54 is slightly turned down so as to form an extension 54b which latter with the adjacent larger diameter of bar 54 forms a step 54c. A cap 57 is screwed onto a correspondingly threaded end portion 55a of tubular member 55 and has a bore through which the extension 54b extends with a slide fit. Thus, said cap 57 will engage the step 54c when the rack 54 occupies the position shown in FIG. 14 thereby limiting the right-hand stroke (with regard to the drawing) of rack 54. It will be appreciated that the stroke of the rack 54 can easily be varied by lengthening or shortening the threaded portion 55a and by varying the position of the transverse stop pin 56.

The tubular member 55 has a cutout 58 through which extend the teeth of the pinion 13 which fully corresponds to the pinion or gear 13 described in connection with FIGS. 2 to 11 and is connected through an overdrive clutch with the engine in the same manner as described above in connection with FIGS. 2 to 11.

The extension 54b of the bar or gear rack 54 is designed in the same manner as described in connection with FIGS. 12 and 13, in other words has a slot 20b. This slot is likewise in the same manner as described in connection with FIGS. 1, 12 and 13 engaged by the link 43 and secured in its position by means of a cotter pin 45. The link 43 has connected thereto the bushing 46 which is pivotally connected to the transverse bar 47, precisely as described in connection with FIGS. 1, 12 and 13.

As will be seen from the above, the arrangement of FIG. 14 is of an extremely simple structure which may be built up from stock material and if employed with the mower handle 42 will result in an extremely simple and highly effective mechanical starting mechanism for gasoline engine powered lawn mowers.

It is, of course, to be understood that the present invention is, by no means, limited to the particular constructions shown in the drawings but also comprises any modifications within the scope of the appended claims. Thus, for instance, while in FIGS. 12 and 13 the starting levers are shown as being pivotally connected to brackets on the mower bottom frame member 50, the pivotal connection may also be effected in any other convenient manner.

What we claim is:

1. In combination with a horticultural implement, especially lawn mower, having an internal combustion engine with a crankshaft, push handle means pivotally connected to said mower for pushing and pulling the same, a starter mechanism comprising an over-riding clutch having one clutch element drivingly connected to said crankshaft and having another clutch element adapted automatically to be locked to said one clutch element when being rotated in a first direction and being freely rotatable with regard to said one clutch element when being rotated in the opposite direction, gear means rotatably connected to said other clutch element for rotation therewith, gear rack means meshing with said gear means and reciprocable in longitudinal direction of said gear rack means for selectively rotating said gear means, said rack means extending in longitudinal direction of said mower, and link means linking said gear rack means to said push handle means to thereby permit the latter in response to a pivoting movement thereof to move said rack means in the longitudinal direction thereof for rotating said gear means and starting said engine.

2. In combination with a horticultural implement, especially a lawn mower, having handle means pivotally connected thereto for pushing said lawn mower and also having an internal combustion engine with a crankshaft: a starter mechanism comprising an overriding clutch having one clutch element drivingly connected to said crankshaft and having another clutch element adapted automatically to be locked to said one clutch element when being rotated in a first direction and being freely rotatable with regard to said one clutch element when being rotated in the opposite direction, gear means rotatably connected to said other clutch element for rotation therewith, gear rack means meshing with said gear means and reciprocable in longitudinal direction of said rack means for selectively rotating said gear means, and means operatively connecting said handle means with said rack means for moving the latter in its longitudinal direction by pivoting said handle means to thereby bring about starting of said engine.

3. In combination with a horticultural implement, especially a lawn mower, having handle means pivotally connected thereto for pushing said lawn mower and also having an internal combustion engine with a crankshaft, a starter mechanism comprising a reciprocable element and an overriding clutch for drivingly connecting said reciprocable element with said crankshaft, said reciprocable element being operable to rotate said crankshaft through said overriding clutch in one direction only, means operatively connecting said handle means to said reciprocable element for moving the same in one direction in response to a tilting movement of said handle in one direction, and spring means operatively connected to said reciprcable element and adapted to be loaded in response to the movement of said reciprocable element in said one direction for moving said reciprocable element in the opposite direction in response to relieving the tilting pressure on said handle in said one tilting direction thereof.

4. In combination with a horticultural implement, especially a lawn mower, having handle means pivotally connected thereto for pushing said lawn mower and also having an internal combustion engine with a crankshaft, a starter mechanism comprising an overriding clutch having one clutch element drivingly connected to said crankshaft and having another clutch element adapted automatically to be locked to said one clutch element when being rotated from a standstill position in a first direction and being freely rotatable with regard to said one clutch element when being rotated in the opposite direction, gear means rotatably connected to said other clutch element for rotation therewith, gear rack means meshing with said gear means and reciprocable in longitudinal direction of said gear rack means for selectively rotating said gear means, means operatively connecting said gear rack means with said handle means for moving said gear rack means in the longitudinal direction thereof in response to a tilting movement of said handle in one direction, first abutment means associated with said rack means for stopping the same at the end of its stroke during the movement of said handle means in a direction opposite to said one tilting direction thereof, and second abutment means effective immediately after said first abutment means becomes effective for stopping said handle if the latter is moved in said opposite direction beyond its stop determined by said first abutment means.

5. A gasoline engine operable horticultural implement, especially lawn mower, having push handle means pivotally connected thereto for pushing and pulling said lawn mower, which comprises: gear means operatively connected to said engine and rotatable for starting said engine, and means operatively connecting said gear means to said push handle means for actuating said gear means from a standstill position thereof in response to a tilting movement of said handle in one direction only.

6. In combination with a horticultural implement, especitlly a lawn mower, having handle means pivotally connected thereto for pushing said lawn mower and also having an internal combustion engine with a crankshaft; a starter mechanism which comprises: a reciprocable element linked to said handle means and reciprocable thereby, rotatable clutch means interposed between said reciprocable element and said crankshaft, said clutch means being drivingly connected to said reciprocable element for rotative movement thereby in one and the opposite direction, said clutch means permitting said reciprocable element to be engaged with said crankshaft in one direction of motion and to be disengaged from said crankshaft in the opposite direction of motion whereby said reciprocable element is operable in response to pivoting of said handle means in one direction to start said engine.

References Cited in the file of this patent

UNITED STATES PATENTS

| | | |
|---|---|---|
| 1,632,264 | Avis | June 14, 1927 |
| 1,973,217 | Miller et al. | Sept. 11, 1934 |
| 2,090,342 | Callsen | Aug. 17, 1937 |
| 2,092,738 | Rodgers | Sept. 7, 1937 |
| 2,562,085 | Dry et al. | July 24, 1951 |
| 2,850,003 | Konle | Sept. 2, 1958 |
| 3,018,768 | Thompson | Jan. 30, 1962 |

FOREIGN PATENTS

| | | |
|---|---|---|
| 439,756 | Great Britain | Dec. 13, 1935 |
| 666,860 | Great Britain | Feb. 20, 1952 |
| 70,203 | Norway | Mar. 25, 1946 |